US008982732B2

(12) United States Patent
Balasubarmaniyan et al.

(10) Patent No.: US 8,982,732 B2
(45) Date of Patent: Mar. 17, 2015

(54) DETECTING NEIGHBORING ACCESS POINTS IN A NETWORK

(71) Applicant: Apple Inc., Cupertino, CA (US)

(72) Inventors: Saravanan Balasubarmaniyan, Los Gatos, CA (US); Kapil Chhabra, Milpitas, CA (US); Tito Thomas, San Jose, CA (US)

(73) Assignee: Apple Inc., Cupertino, CA (US)

( * ) Notice: Subject to any disclaimer, the term of this patent is extended or adjusted under 35 U.S.C. 154(b) by 106 days.

(21) Appl. No.: 13/768,669

(22) Filed: Feb. 15, 2013

(65) Prior Publication Data
US 2014/0105195 A1 Apr. 17, 2014

Related U.S. Application Data

(60) Provisional application No. 61/600,542, filed on Feb. 17, 2012.

(51) Int. Cl.
H04L 12/28 (2006.01)
H04W 4/00 (2009.01)
H04W 36/00 (2009.01)
H04W 48/20 (2009.01)

(52) U.S. Cl.
CPC .................... H04W 48/20 (2013.01)
USPC ........ 370/255; 370/328; 370/400; 455/432.1; 455/436

(58) Field of Classification Search
CPC ............ H04W 36/08; H04W 36/0083; H04W 36/0061; H04W 36/12; H04W 36/14; H04W 36/18; H04W 48/16; H04W 48/20; H04W 88/08; H04W 8/005; H04W 40/246; H04J 11/0093; H04J 11/0069

USPC ......... 370/252, 254–255, 310–350, 229–238, 370/395.2, 400–401; 455/404.2, 414.2, 455/431–444, 449–453, 464
See application file for complete search history.

(56) References Cited

U.S. PATENT DOCUMENTS

| 6,195,551 | B1* | 2/2001 | Kim et al. | 455/436 |
| 6,295,450 | B1* | 9/2001 | Lyer et al. | 455/436 |
| 6,430,414 | B1* | 8/2002 | Sorokine et al. | 455/442 |
| 7,397,779 | B2* | 7/2008 | Chandra et al. | 370/332 |
| 8,041,319 | B2* | 10/2011 | He et al. | 455/144 |
| 8,140,076 | B2* | 3/2012 | Ponce de Leon et al. | 455/437 |
| 8,478,265 | B2* | 7/2013 | Orlassino | 455/432.1 |
| 8,767,645 | B2* | 7/2014 | Kim et al. | 370/329 |

(Continued)

OTHER PUBLICATIONS

International Search Report and Written Opinion in Application No. PCT/US2013/025296, May 8, 2013, pp. 1-12.

(Continued)

Primary Examiner — Tri H Phan
(74) Attorney, Agent, or Firm — Meyertons, Hood, Kivlin, Kowert & Goetzel, P.C.

(57) ABSTRACT

An electronic device, e.g., a mobile device, having access to a wireless network roams from one access point (AP) to another using access point detection based on location and learning. A learning scheme may modify a list of nearby access points determined based on location to identify neighboring access points where roaming is possible. The identified neighboring access points where roaming is possible may be ordered based on roaming history, such as the frequency of the roams to a particular AP. The roaming history may be maintained on a per client basis or aggregated across all clients using an AP.

20 Claims, 4 Drawing Sheets

(56) References Cited

U.S. PATENT DOCUMENTS

| | | |
|---|---|---|
| 2008/0117875 A1 | 5/2008 | Bennett et al. |
| 2008/0227455 A1 | 9/2008 | Kim |
| 2008/0293400 A1* | 11/2008 | Okabe .......................... 455/423 |
| 2008/0293405 A1* | 11/2008 | Meyer ...................... 455/432.1 |
| 2008/0311914 A1* | 12/2008 | Tinnakornsrisuphap et al. ........................... 455/436 |
| 2009/0156210 A1 | 6/2009 | Ponce de Leon et al. |
| 2010/0124924 A1 | 5/2010 | Cheng et al. |

OTHER PUBLICATIONS

International Preliminary Report on Patentability from PCT/US2013/025296, issued Aug. 28, 2014, Apple Inc., pp. 1-9.

* cited by examiner

US 8,982,732 B2

DETECTING NEIGHBORING ACCESS POINTS IN A NETWORK

PRIORITY DATA

This application claims benefit of priority to U.S. Provisional Application Ser. No. 61/600,542, titled "Detecting Neighboring Access Points in a Network", filed Feb. 17, 2012, whose inventors are Saravanan Balasubarmaniyan, Kapil Chhabra, and Tito Thomas, and which is hereby incorporated by reference in its entirety as though fully and completely set forth herein.

TECHNICAL FIELD

The technical field relates generally to the network communications, and in particular wireless network communications.

SUMMARY OF THE DESCRIPTION

Methods, machine readable tangible storage media, and data processing systems that enable detecting neighboring access points in a network are described.

A mobile device having access to a wireless network roams from one access point (AP) to another using access point detection based on location and learning. In one embodiment, a learning scheme modifies a list of nearby access points determined based on location to identify neighboring access points where roaming is possible. In one embodiment, the identified neighboring access points where roaming is possible is ordered based on roaming history, such as the frequency of the roams to a particular AP. The roaming history may be maintained on a per client basis or aggregated across all clients using an AP.

In one embodiment, location is determined from location data obtained from a topology map of the access points in the network. Alternatively, or in addition, location is discovered based on received signal strength indication (RSSI) in accordance with existing wireless communication standards. Location may be determined at the AP, mobile client or wireless network controller level, such as at a wireless local area network (WLAN) controller that controls the APs in the network.

In one embodiment, learning is determined from a history of which APs in the network have been roamed to in the past from the perspective of a particular AP or mobile client. In one embodiment, learning is determined at the AP level. Alternatively, or in addition, in one embodiment, learning is determined at the mobile client or WLAN controller level. For example, in one embodiment, the WLAN controller, which already monitors roaming of clients, can build a list of neighbor APs for a given AP and then upload the information to the APs, which can then make the information available to their clients. Alternatively, or in addition, mobile clients can build the list of neighbor APs themselves based on their roaming behavior.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
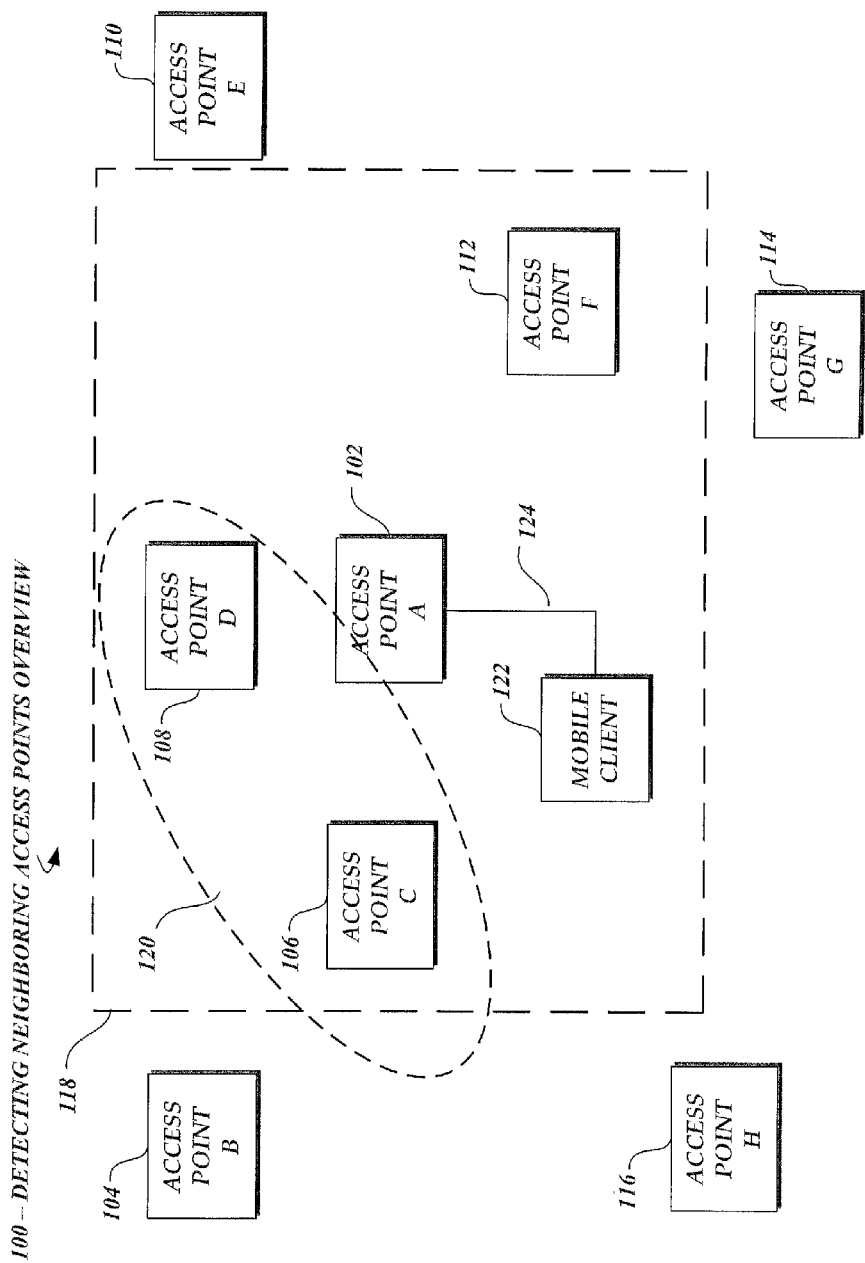
FIG. 1 is a block diagram overview illustrating one embodiment of detecting neighboring access points using location and learning.

Methods and apparatuses for enabling detecting neighboring access points in a network are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g. circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

There are several mechanisms that are involved in achieving successful roaming in enterprise networks. Typically, a mobile client that wants to roam begins scanning for other APs. Once an AP is found and deemed adequate, the client roams to that AP.

For example, the wireless standard IEEE 802.11k was developed to enable an AP to inform its clients of its neighboring APs, including the channels on which the client can expect to find them. The clients begin scanning on those particular channels hoping to find a candidate AP to roam. Unfortunately, the list of neighbors supplied by the AP is not always accurate. As a result, the scanning time incurred by the clients can be substantial. In the worst case, clients may not find suitable APs to roam from the list and end up scanning all channels. There are 13 channels to scan on 2.4 GHz and 22 channels on the 5 GHz. Thus a dual-band client would potentially have to scan 35 channels. To make the matters worse, some of the channels are DFS channels which forces the client to do passive scanning (i.e., wait for more than one beacon period per channel). Hence, the accuracy of the list of neighbors supplied by AP is critical to the client's roaming performance and to the applications supported.

Because the IEEE 802.11k standard does not specify mechanisms for the AP to detect its one-hop neighbors, it is left to the vendors to do develop their own implementation. Typical vendor implementation is based on received signal strength indicators (RSSI) where one AP selects its neighbors if it hears them at an RSSI better than a pre-determined threshold. However, this scheme is often unreliable because of RSSI measurement limitations. For example, RSSI measurements vary over time based on the composition of the physical path between the two entities making the measurement.

In one embodiment of the invention described herein, mobile devices roam a wireless network efficiently and with minimal interruption using a novel access point (AP) detection algorithm based on both location and learning. The mobile device may be any type of mobile communications device, such as a cell phone, or other type of mobile computing device, including but not limited to an iOS® device, an iPhone® or iPad® device from Apple Inc., or other mobile computing devices from other providers. The network on which the mobile devices roam may be any wireless network having access points and a wireless controller configured in accordance with wireless network standards such as the IEEE 802.11 standard.

Among other advantages, the described embodiments of the novel access point (AP) detection algorithm based on both location and learning reduce the time it takes a client to scan and find suitable APs to roam. The novel AP detection algorithm detect the one-hop or next-hop APs that are potential roam candidates for a client or clients connected to an AP. In the described embodiments, the algorithms can be implemented in the client, AP or in the WLAN infrastructure.

In a typical embodiment, the AP detection algorithm has two parts: a) detecting a neighboring AP by location and b) learning neighboring APs based on actual roams to other APs in the network. Though these schemes are mutually exclusive, the AP detection algorithm advantageously implements them in conjunction with each other as each scheme's shortcomings are complemented by the other scheme. Both the schemes can be used by the WLAN infrastructure (AP or the WLAN controller) and by clients.

One way to detect location is to use the existing RSSI standard. In the existing RSSI standard, an AP measures the RSSI of packets transmitted by other APs surrounding it. If the RSSI is above a certain threshold, the AP declares the other AP as its neighbor. However, as noted above, this simple scheme is not a reliable measure for detecting neighbors because RSSI measurements vary over time depending on the composition of the physical path between the two entities making the measurement.

For instance, using RSSI a far away AP that has a clear line of sight with another AP will be declared as a closer neighbor than a AP that is physically close but is placed behind concrete walls or steel doors. A client's roaming pattern, presence/absence of certain kinds of obstacles make it challenging to use RSSI measurement as an indicator of proximity. Moreover, in a typical WLAN deployment, neighboring APs are placed on non-overlapping channels to reduce co-channel interference. As a result, performing RSSI measurements of neighboring APs require the AP doing measurement to go off-channel which would affect data and WiFi connectivity of clients being served by that AP.

In one embodiment, the AP detection algorithm overcomes some of the disadvantages of using RSSI by adapting to changes in network topology quickly depending on whether the new AP can be heard by the other APs or not, as will be described below.

In one embodiment, the AP detection algorithm takes advantage of the ability to provide and obtain the location of deployed APs in terms of latitude and longitude. Using this information, embodiments of the AP detection algorithm of the present invention can detect APs that are within a certain distance from a given AP and declare them to be its one-hop neighbors. The novel AP detection scheme adapts to changes in topology (addition/deletion of APs) quickly as soon as the new location of APs are loaded.

Unfortunately, simply loading the network topology map on every change in topology can be time and computationally expensive, which limits the usefulness of using location only. In addition, location alone may result in false alarms, i.e. neighbors detected using this method may not have a physically traversable path between them as it depends on the building layout which will typically not be available.

Therefore, in a typical embodiment, the AP detection algorithm also employs neighbor detection by learning. For example, by tracking the roaming behavior of clients, APs can reliably map the list of neighboring APs to which clients connected to them roam. Over time, an AP can learn all its neighbors and order them based on number of roams that happen between them. To maximize the benefit of learning, the number of roams, or roaming history, can be learned and maintained per client or across all clients of the AP.

In a typical embodiment, the list of nearby APs determined by location, either by RSSI or location distance, even when determined under ideal conditions (i.e., no false detection, only neighbors to which handoffs can actually occur are detected) can be a substantial number depending on the AP deployment. More useful is a list that is subset of the nearby APs, but ordered/adjusted based on the actual roams to the nearby APs that have taken place. In a typical embodiment, when this list is maintained on a per-client basis, it will help critically in bringing down the number of channels a client has to scan.

In one embodiment, APs can learn of this list with the help of the WLAN controller that monitors every client roam happening in the WLAN system. Alternatively, or in addition, in one embodiment clients can also learn this list without the assistance of APs in a slightly different way. The clients can keep track of the APs to which they have already roamed to/from. For example, in one embodiment, the clients maintain a directed acyclic graph(DAG) of their roam pattern. Each node/vertex in the graph represents an AP (identified by bssid, channel etc.), whereas a directed edge represents a roam from one AP (one vertex) to another AP (other vertex) with the direction of edge representing the direction of the roam. In one embodiment, the edge can have properties such as number of roams that have occurred previously. Over time, with learning based on past roams, the client will know the list of neighboring APs that the client can possibly roam to based on its current AP.

In operation, in a typical embodiment, when the client needs to scan as part of the roaming process, it would determine the vertex/node representing the current AP in its DAG and gather the list of vertices connected to the current AP. In one embodiment, the client can further order the list of APs by the number of roams the mobile device had completed with that AP and use it as a guide while scanning.

Given that in an enterprise environment APs are static and that clients roaming behavior is fairly consistent over a given period of time, in that most enterprise clients will typically be connected to the AP closest to their cube and roam within a small subset of APs depending on their activities, the AP detection algorithm described in embodiments of the invention can accurately predict a smaller and manageable number of APs that the client will most likely roam to based on its past behavior than might otherwise be predicted using existing schemes.

In a typical embodiment, one limitation of this scheme is the time it takes to learn changes in network topology like removal of AP to which frequent roams occurred. To accommodate this limitation, the AP detection algorithm periodically times out old entries and gives more importance to learning that occurred in the recent past than learning that occurred earlier. In a typical embodiment, effectively and quickly addressing this limitation is accomplished by implementing learning in tandem with either the RSSI or location based scheme.

Thus, in a typical embodiment, the AP detection algorithm uses location and learning in conjunction to derive maximum benefit. For example, neighbor detection based on RSSI and location may not always be accurate and can potentially populate the list of neighbors with APs that clients can never roam to due to physical path limitations or due to user behavior. On the other hand, the learning based mechanism will modify the list with actual neighbors to which roams are possible and order them based on the frequency of the roams to enhance roaming efficiency. In one embodiment, the learning occurs at the client, AP or WLAN infrastructure. For example, the WLAN controller which already monitors roaming of clients, builds the list of neighbors for a given AP and then upload the information to the APs. Clients can build their own lists based on their roaming behavior.

FIG. 1 is a block diagram overview illustrating an overview of detecting neighboring APs using a simplified example of APs is a network, and in accordance with to one embodiment of the invention. As is shown, a AP, Access Point A 102 is configured in a wireless network composed of numerous other access points, B-G, 104-114. A mobile client 122 in communication with the AP A 102 via connection 124 wants to roam to another AP. In one embodiment, the detection algorithm determines that APs C-106, D-108 and F-112 are nearby APs 118 based on location as designated by the rectangular dotted line grouping 118. The detection algorithm further determines that only a subset of APs, namely AP C-106 and AP D-108, are neighboring APs suitable for roaming based on learning as designated by the oval dotted line grouping 120. The mobile client 122 can then use the list containing just the subset of APs, AP C-106 and AP D-108, for roaming instead of a larger and potentially less efficient list of candidate APs.

Figure 2:
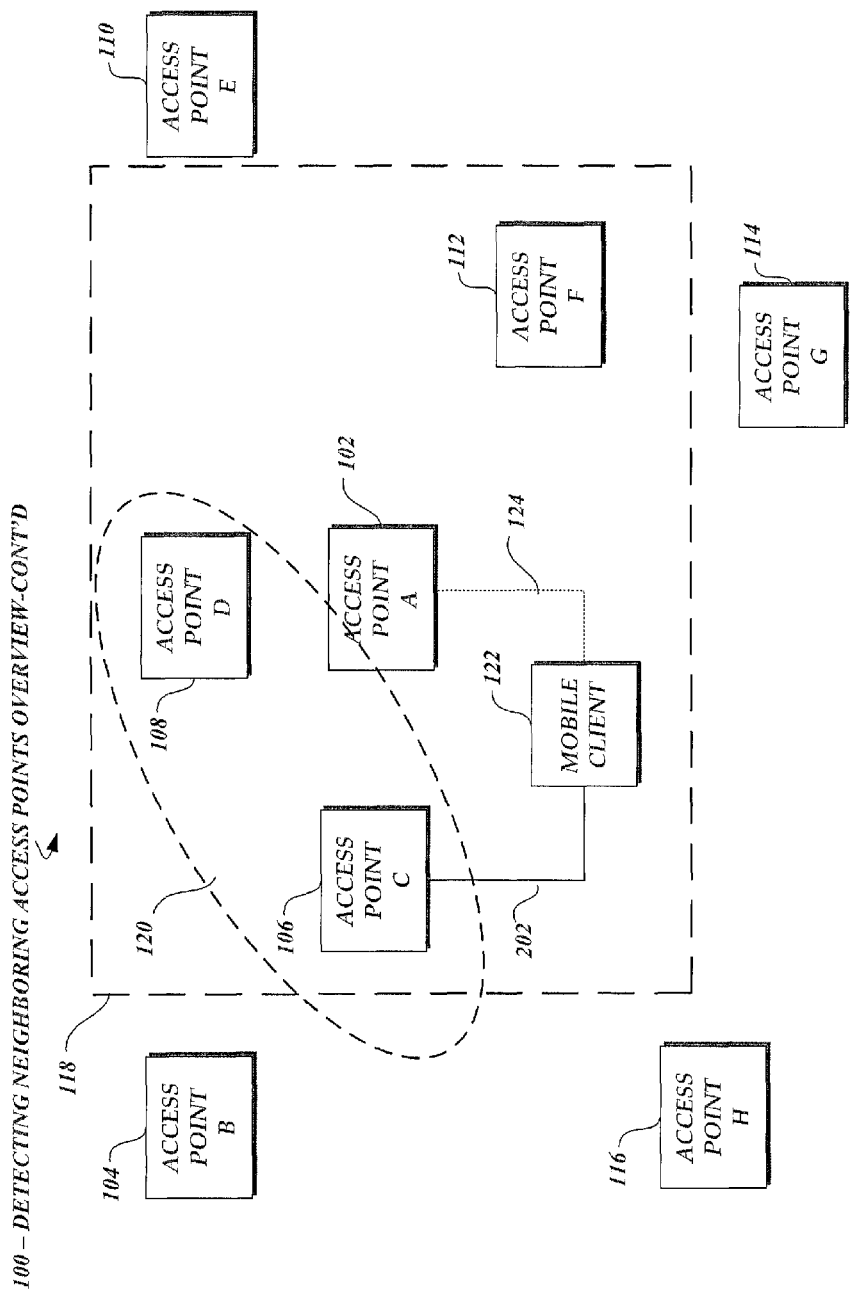
FIG. 2 is a block diagram overview illustrating one embodiment of detecting neighboring access points using location and learning in further detail.

FIG. 2 is a block diagram overview illustrating in further detail the embodiment described in FIG. 1, specifically that the mobile client 122 has successfully roamed to AP C-106 from the AP A-102, and has established a new connection 202 with AP C-106.

Figure 3:
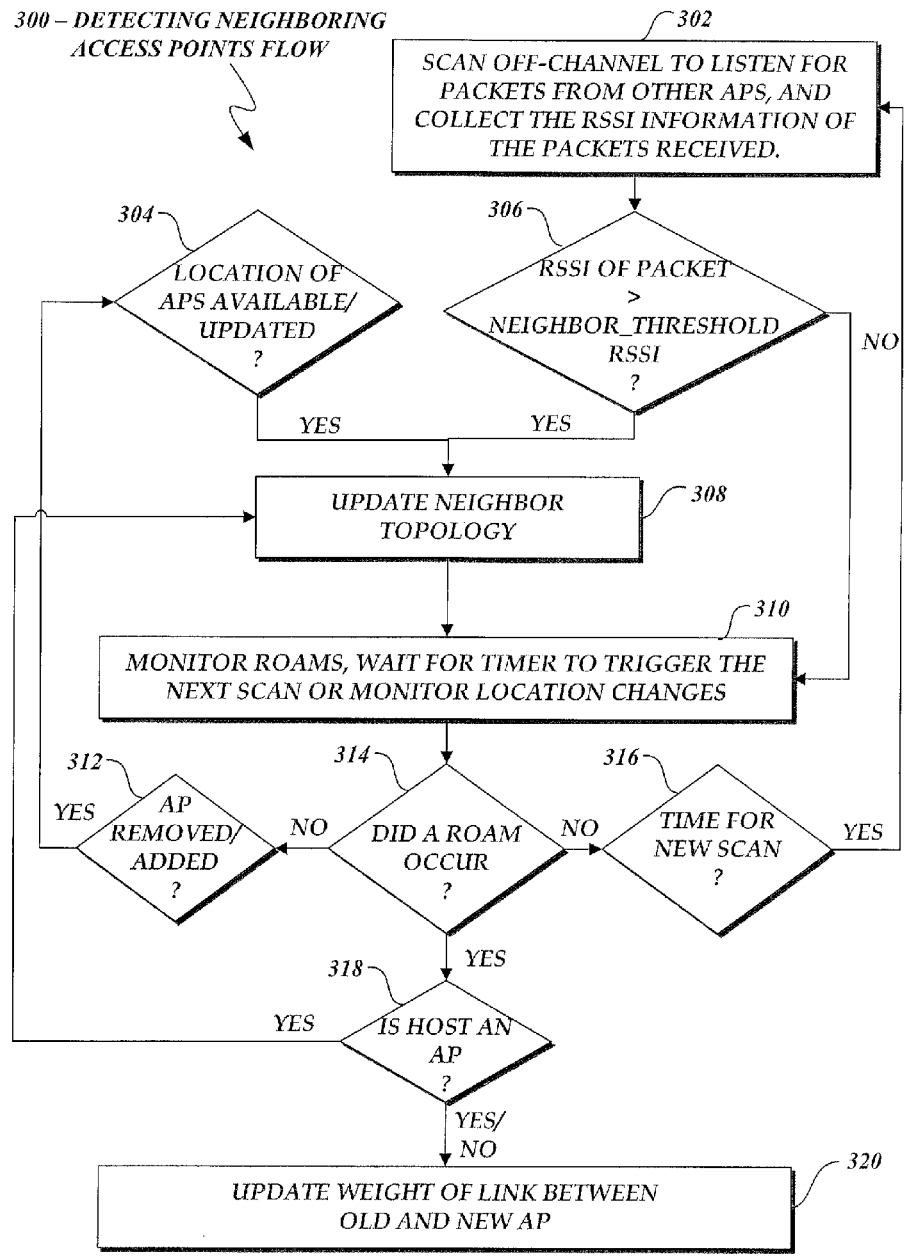
FIG. 3 is a flow diagram illustrating an embodiment of a process logic to detect neighboring access points using location and learning.

FIG. 3 is a flow diagram illustrating embodiments of a process 300 for detecting neighboring access points in a network. As illustrated, at block 302 the process 300 performs scans off-channel to listen for packets from other APs, and collects the RSSI information from the packets received. At decision block 306, the process 300 determines whether the RSSI signal strength is above the threshold for declaring that the other AP is a nearby AP. Alternatively, or in addition, the process 300, at decision block 304, determine whether the location of APs are available or updated as provided by a topology map, typically from the WLAN controller. Either way, at process block 308, the process 300 updates the neighbor topology based on the acquired location information.

In one embodiment, the process 300 continues at process block 310, in which roams to other APs are monitored, as well as monitoring timers for triggering a new scan (process 302) or determining new location changes (decision 304). For example, at decision block 314, the process 300 determines whether a roam has occurred, and if so whether the host to which the client roamed is an AP in the network. The process 300 continues to process block 320, in which the process 300 updates the weight of the link between the old AP and the new AP as appropriate.

In one embodiment, if a roam did not occur, then the process 300 continues at decision block 312 to determine whether an AP was removed or added, returning to decision block 304. Alternatively, or in addition, the process 300 continues at decision block 316 to determine whether it is time for a new scan, returning to process block 302. In this manner, the process 300 maintains the list of neighboring APs as accurately as possible to enable efficient detection of neighboring APs when needed by mobile clients.

Figure 4:
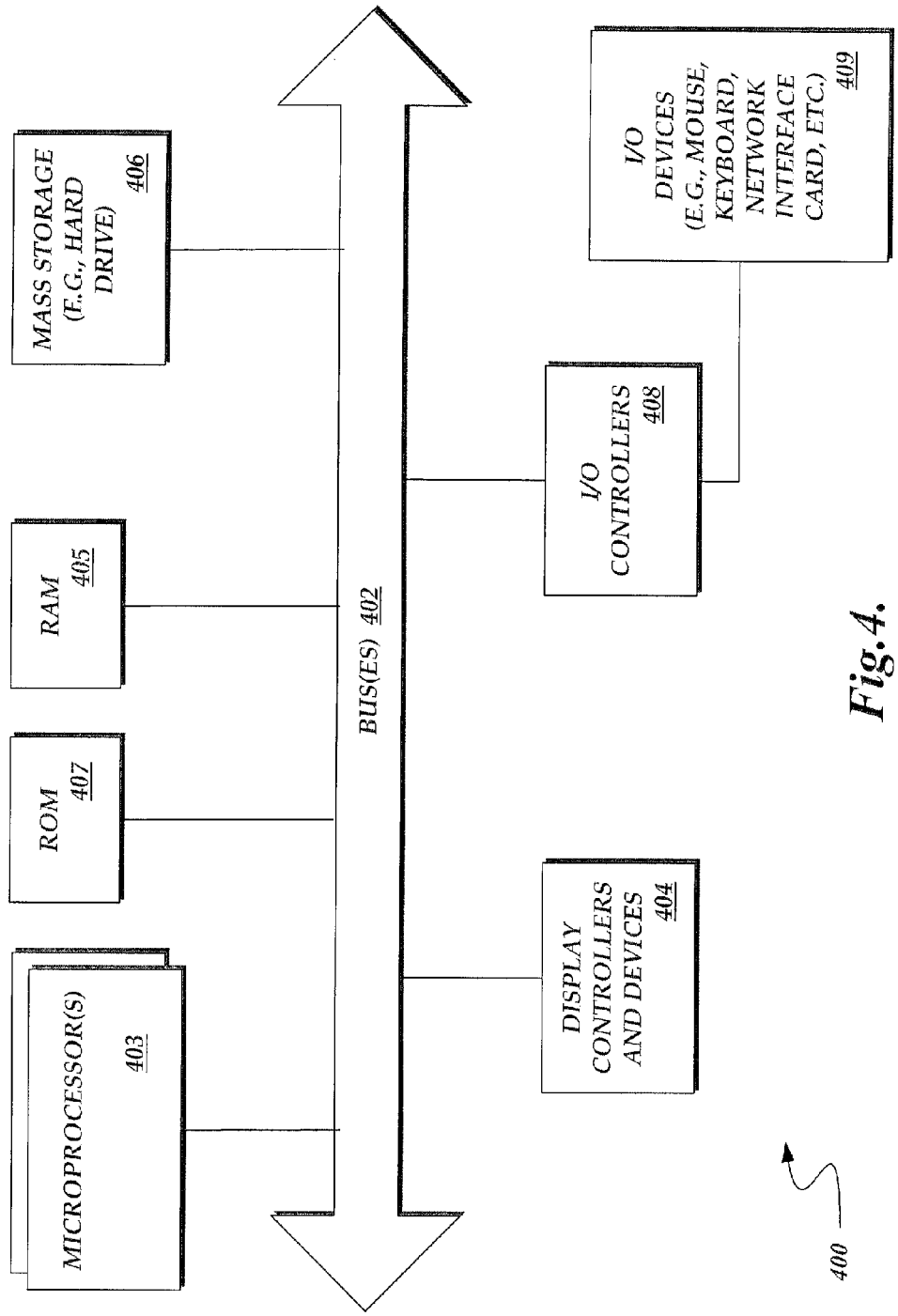
FIG. 4 illustrates an example of a typical computer system which may be used in conjunction with the embodiments described herein.

FIG. 4 shows one example of a typical data processing system which may be used with the present invention. Note that while FIG. 4 illustrates the various components of a data processing system, such as a computer system, it is not intended to represent any particular architecture or manner of interconnecting the components as such details are not germane to the present invention. It will also be appreciated that other types of data processing systems which have fewer components than shown or more components than shown in FIG. 4 may also be used with the present invention. The data processing system of FIG. 4 may be a Macintosh computer from Apple Inc. of Cupertino, Calif., or a mobile computer system such as that employed on mobile devices, or a network system such as that employed on network access point devices. As shown in FIG. 4, the data processing system 400 includes one or more buses 402 which serve to interconnect the various components of the system. One or more processors 403 are coupled to the one or more buses 402 as is known in the art. Memory 405 may be DRAM or non-volatile RAM or may be flash memory or other types of memory. This memory is coupled to the one or more buses 402 using techniques known in the art. The data processing system 400 can also include non-volatile memory 406 and 407 which may be a hard disk drive or a flash memory or a magnetic optical drive or magnetic memory or an optical drive or other types of memory systems which maintain data even after power is removed from the system. The non-volatile memory 406 and 407 and the memory 405 are both coupled to the one or more buses 402 using known interfaces and connection techniques. A display controller 404 is coupled to the one or more buses 402 in order to receive display data to be displayed on a display device 404 which can display any one of the user interface features or embodiments described herein. The display device 404 can include an integrated touch input to provide a touch screen. The data processing system 400 can also include one or more input/output (I/O) controllers 408 which provide interfaces for one or more I/O devices 409, such as one or more mice, touch screens, touch pads, joysticks, and other input devices including those known in the art and output devices (e.g. speakers). The input/output devices 409 are coupled through one or more I/O controllers 408 as is known in the art. While FIG. 4 shows that the non-volatile memory 406 and 407 and the memory 405 are coupled to the one or more buses 402 directly rather than through a network interface, it will be appreciated that the data processing system may utilize a non-volatile memory which is remote from the system, such as a network storage device which is coupled to the data processing system through a network interface such as a modem or Ethernet interface or a wireless interface, such as a wireless WiFi transceiver or a wireless cellular telephone transceiver or a combination of such transceivers. As is known in the art, the one or more buses 402 may include one or more bridges or controllers or adapters to interconnect between various buses. In one embodiment, the I/O controller 408 includes a USB adapter for controlling USB peripherals and can control an Ethernet port or a wireless transceiver or combination of wireless transceivers. It will be apparent from this description that aspects of the present invention may be embodied, at least in part, in software. That is, the techniques and methods described herein may be carried out in a data processing system in response to its processor executing a sequence of instructions contained in a tangible, non-transitory memory such as the memory 405 or the non-volatile memory 406 and 407 or a combination of such memories, and each of these memories is a form of a machine readable, tangible storage medium. In various embodiments, hardwired circuitry may be used in combination with software instructions to implement the present invention. Thus the techniques are not limited to any specific combination of hardware circuitry and software or to any particular source for the instructions executed by the data processing system.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g. an abstract execution environment such as a "virtual machine" (e.g. a Java Virtual Machine), an interpreter, a Common Language Runtime, a high-level language virtual machine, etc.), and/or, electronic circuitry disposed on a semiconductor chip (e.g. "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g. one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g. a server) to a requesting computer (e.g. a client) by way of data signals embodied in a propagation medium (e.g. via a communication link (e.g. a network connection)).

The term "memory" as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into memory during execution of software by a processor. One of skill in the art will immediately recognize that the term "machine-readable storage medium" includes any type of volatile or non-volatile storage device that is accessible by a processor.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A mobile device, comprising:
   a processor; and
   a memory, coupled to the processor, wherein the memory stores program instructions executable by the processor to:
   determine nearby access points of an access point in a network;

determine access points to which mobile devices that are clients of the access point have previously roamed, thereby determining previously roamed access points;

identify neighboring access points that are previously roamed access points and that are also nearby access points; and order neighboring access points based on how many roams to the neighboring access points have occurred and when the roams occurred, wherein neighboring access points having a greater number of roams are ordered higher than neighboring access points having a lesser number of roams, wherein roams that occurred before a certain period are timed out.

2. The mobile device of claim 1, wherein to determine nearby access points of the access point in a network, the program instructions are executable to:

determine the nearby access points based on location, the nearby access points being located within a specified threshold distance from the access point.

3. The mobile device of claim 2, wherein to determine nearby access points based on location, the program instructions are executable to:

access a topology of the network in which the access point is deployed, the topology indicating proximity of one access point to another based on distance.

4. The mobile device of claim 1, wherein to order neighboring access points, the program instructions are executable to:

order the neighboring access points based on how many roams have occurred for the mobile device from the access point to each neighboring access point.

5. The mobile device of claim 1, wherein to order neighboring access points, the program instructions are executable to:

order neighboring access points based on how many roams have occurred from the access point to each neighboring access point for all mobile devices that are clients of the access point.

6. The mobile device of claim 1, wherein to determine nearby access points of the access point in a network, the program instructions are executable to:

determine nearby access points based on a received signal strength indicator (RSSI) of packets transmitted by surrounding access points of the access point, the nearby access points transmitting packets above a threshold signal strength.

7. The mobile device of claim 1, wherein the program instructions are further executable to:

maintain a directed acyclic graph (DAG) of a roam pattern of the mobile device, wherein each node/vertex in the graph represents a respective access point, wherein a directed edge represents a roam from one access point to another access point with the edge direction representing the direction of the roam, and wherein the nearby access points are determined based on location using the DAG and the vertex presenting the access point.

8. A method for determining neighboring access points for roaming in a network, the method comprising:

determining, by an electronic device, nearby access points of an access point in a network;

determining, by the electronic device, access points to which mobile devices that are clients of the access point have previously roamed, thereby determining previously roamed access points;

identifying, by the electronic device, neighboring access points that are previously roamed access points and that are also nearby access points; and ordering, by the electronic device, neighboring access points based on number of roams to the neighboring access points from the access point and when the roams occurred, wherein neighboring access points having a greater number of roams are ordered higher than neighboring access points having a lesser number of roams, wherein roams that occurred before a certain period are timed out.

9. The method of claim 8, wherein said determining nearby access points is based on location, the nearby access points being located within a threshold distance from the access point.

10. The method of claim 9, wherein said determining nearby access points based on location is determined from accessing a topology of the network in which the access point is deployed, the topology indicating proximity of one access point to another.

11. The method of claim 8, wherein said ordering neighboring access points is based on how many roams have occurred for a particular mobile device that is a client of the access point.

12. The method of claim 8, wherein said ordering neighboring access points is based on how many roams have occurred for all mobile devices that are clients of the access point.

13. The method of claim 8, wherein said determining nearby access points is based on a received signal strength indicator (RSSI) of packets transmitted by access points surrounding the access point, the nearby access points transmitting packets above a specified threshold signal strength.

14. The method of claim 8, further comprising:

maintaining, by the electronic device, a directed acyclic graph (DAG) of a roam pattern of the electronic device, wherein each node/vertex in the graph represents an access point, whereas a directed edge represents a roam from one access point to another access point with the edge direction representing the direction of the roam, and wherein the nearby access points are determined based on location using the DAG and the location of the access point.

15. A non-transitory tangible machine readable storage medium that stores program instructions executable by a processor to:

determine nearby access points of an access point in a network;

determine access points to which mobile devices that are clients of the access point have previously roamed;

identify neighboring access points as a subset of access points to which mobile devices that are clients of the access point have previously roamed that are also nearby access points; and order neighboring access points based on how many roams to the neighboring access points have occurred and when the roams occurred, wherein neighboring access points having a greater number of roams are ordered higher than neighboring access points having a lesser number of roams, wherein roams that occurred before a certain period are timed out.

16. The non-transitory tangible machine readable storage medium of claim 15, wherein to determine nearby access points of the access point in a network, the program instructions are executable to:

determine the nearby access points based on location, the nearby access points being located within a specified threshold distance from the access point.

17. The non-transitory tangible machine readable storage medium of claim 16, wherein to determine nearby access points based on location, the program instructions are executable to:
access a topology of the network in which the access point is deployed, the topology indicating proximity of one access point to another based on distance.

18. The non-transitory tangible machine readable storage medium of claim 15, wherein to order neighboring access points, the program instructions are executable to:
order the neighboring access points based on how many roams have occurred for a specified mobile device that is a client of the access point from the access point to each neighboring access point.

19. The non-transitory tangible machine readable storage medium of claim 15, wherein to order neighboring access points, the program instructions are executable to:
order neighboring access points based on how many roams have occurred from the access point to each neighboring access point for all mobile devices that are clients of the access point.

20. The non-transitory tangible machine readable storage medium of claim 15, wherein to determine nearby access points of the access point in a network, the program instructions are executable to:
determine nearby access points based on a received signal strength indicator (RSSI) of packets transmitted by access points surrounding the access point, the nearby access points transmitting packets above a threshold signal strength.

* * * * *